March 13, 1951     H. B. MARSHALL ET AL     2,544,999
METHOD OF PRODUCING VANILLIN
Original Filed July 23, 1945
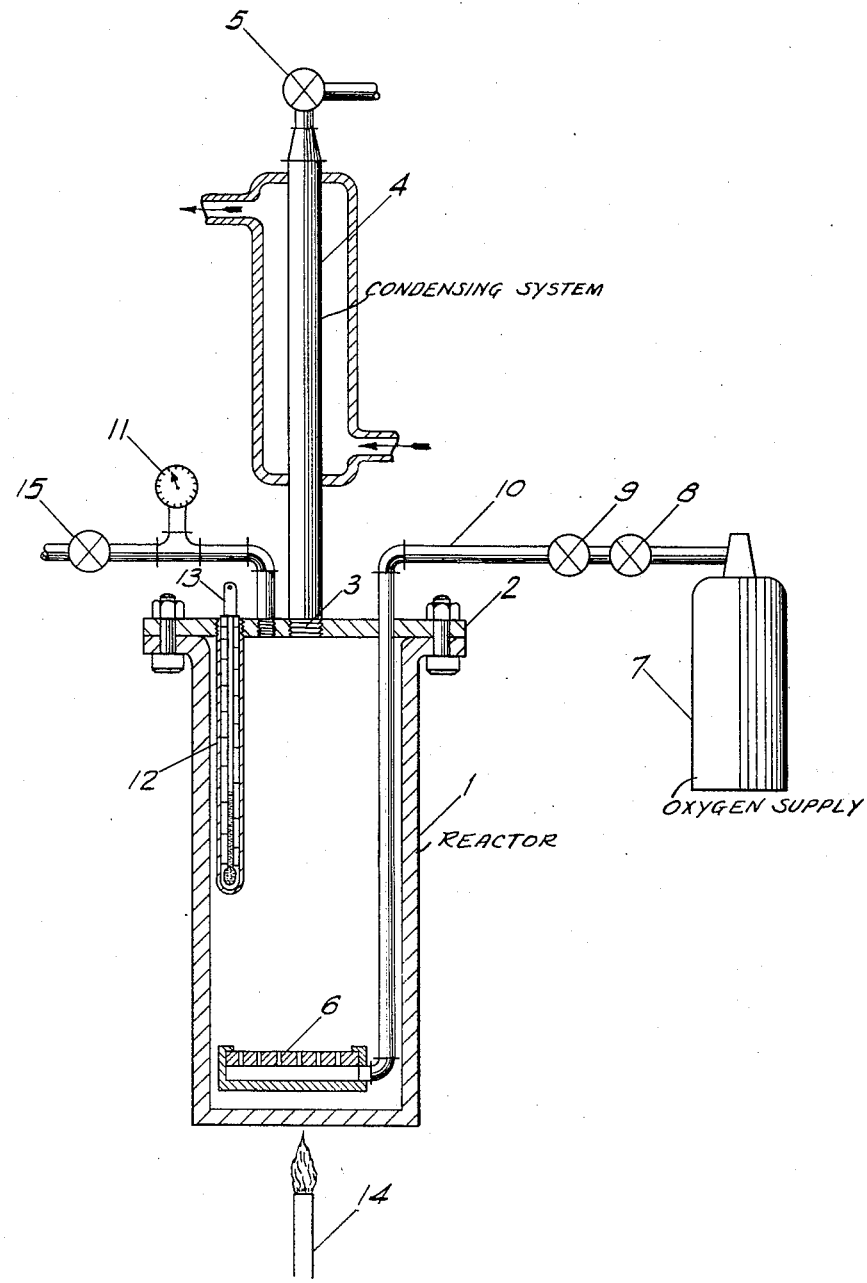
INVENTORS
HARRY BORDEN MARSHALL
&
CHARLES ALFRED SANKEY
BY-
ATTORNEY Patented Mar. 13, 1951

2,544,999

UNITED STATES PATENT OFFICE 2,544,999

METHOD OF PRODUCING VANILLIN

Harry Borden Marshall, Toronto, Ontario, and Charles Alfred Sankey, St. Catherines, Ontario, Canada, assignors to The Ontario Paper Company Limited, Thorold, Ontario, Canada Original application July 23, 1945, Serial No. 606,690. Divided and this application August 8, 1947, Serial No. 767,626. In Canada July 9, 1945

5 Claims. (Cl. 260—600)

This invention relates to the production of vanillin from waste sulphite liquor, and especially from the same after it has been so treated that the fermentable sugar content thereof has been reduced.

This application is a division of our co-pending application Serial Number 606,690, filed July 23, 1945.

It is well known that some vanillin is produced when effluents from acid chemical processes for producing paper pulp are subjected to the action of suitable oxidizing agents especially under alkaline conditions. We have also previously discovered certain means by which the yield of vanillin from a given quantity of waste sulphite liquor may be increased. For example, the lignin-containing substance may be subjected to an alkaline pre-oxidation by bubbling finely dispersed oxygen or air therethrough under temperature conditions of reflux at atmospheric pressure, as a preliminary step to subsequent and principal oxidation designed to produce vanillin.

We have now discovered a method by which air or oxygen may itself serve as an oxidizing agent to effect the production of vanillin at highly satisfactory yields. We are aware that air or oxygen have previously been used to bring about the production of vanillin from lignin-containing substances under alkaline conditions but, in general the yields obtained have been unsatisfactory, indeed it has even been reported that the yield of vanillin is decreased by the introduction of air into the reaction mixture during the course of vanillin production therefrom. We ourselves have previously obtained a very small yield of vanillin during the pre-oxidation referred to above.

The essence of our present invention lies in the fact that air or oxygen may be employed to great advantage if it is finely dispersed so as to provide adequate contact with the alkaline lignin-containing liquor under conditions of temperature and pressure which are controlled so as to bring the reaction mixture to a sufficiently high temperature so that the reaction rate is thereby increased and, at the same time, so that the conditions of oxidation are not rendered sufficiently severe to result in the decomposition of a substantial portion of such vanillin as it is formed. We have found that reaction pressures in the range 50–200 lbs. per square inch and temperatures in the range 150°–200° C. at such pressures normally give highly satisfactory yields of vanillin. Since, in accordance with our invention the yield of vanillin is dependent on conditions other than the temperature and pressure in the reaction vessel, the reaction conditions to obtain optimum yields must be selected with additional factors in mind.

The principal requirement is that the lignin-containing substances must be subjected to an adequate exposure to oxygen in the reaction vessel, but not to over-exposure, which would result in lower vanillin yields and, in the extreme, to complete destruction of any vanillin which had been formed. The available partial pressure of oxygen in the reaction vessel under the other reaction conditions and the time of exposure of the lignin-containing substances to such partial oxygen pressure are highly important. The exposure to oxygen is dependent on the percentage of oxygen in the gas present in the reaction vessel, the temperature and pressure in the reaction vessel, the rate of flow of gas through the reaction vessel, and on the conditions of agitation which are determined by the specific details of design of the apparatus. Additional means of agitation other than the means provided by gas bubbles may be employed to advantage, if desired.

The selection of preferred conditions is therefore necessarily functional. Thus the preferred reaction time for a given lignin-containing substance at a given temperature and given partial oxygen pressure must be selected for the particular degree and kind of agitation which is possible in the reaction vessel. The particular combination of conditions will normally be preferred which gives the most economical production of vanillin.

As a further guide to preferred conditions we have found that optimum vanillin yields generally correspond to partial oxygen pressures in the reaction vessel of less than 10 lbs. per square inch when the temperature is in the range of 175° to 200° C., and to partial oxygen pressures of less than 20 lbs. per square inch in the reaction vessel at temperatures below 175° C. It is also possible to operate under higher reaction vessel gauge pressures than 200 lbs. per square inch and still obtain reasonable yields of vanillin provided that the partial oxygen pressure in the reaction vessel is kept low. In this case the excessive gauge pressure results from a build up of inert gas (for example nitrogen) in the reaction vessel.

The "partial pressure of oxygen" is determined by obtaining the absolute pressure due to all non-condensable gases in the reaction vessel and taking that percentage of such pressure as corresponds to the percentage of oxygen in such non-condensable gases. To illustrate:

Total gauge pressure in reaction vessel as observed—200 lbs. per square inch (corresponding absolute pressure—214.7 lbs. per square inch).

Observed temperature—170° C.

Steam pressure at 170° C. over a reaction mixture containing 100 grammes per litre sodium hydroxide (from steam tables, with allowance for depression due to dissolved caustic)—104.7 lbs. per square inch absolute approx.

Oxygen percentage (by analysis of non-condensable gases in reaction vessel)—15%.

Partial oxygen pressure 15% of
(214.7−104.7) = 16.5
lbs. per square inch.

We have also found that the preferred reaction conditions in accordance with our invention generally involve a time of reaction of less than four hours and, in general, a shorter time is preferred corresponding to more severe conditions of oxidation.

An adequate concentration of alkali is also important and the influence of such concentration is later illustrated by a description of experiments which we have performed. In applying our invention a concentration of alkali is preferred which promotes the most economical production of vanillin.

If the design of the reaction vessel is such that the lignin-containing substances are not adequately exposed to oxygen it will be obvious that the preferred remaining conditions should correspond to more severe oxidation. Indeed with inefficient exposure to oxygen the limits of partial pressure of oxygen and reaction time specified in the claims may be exceeded and good vanillin yields still obtained. Such conditions are to be considered as falling within the scope of our invention. Conversely if the reaction vessel provides unusually good exposure of the lignin-containing substances the preferred remaining conditions will correspond to less severe oxidation. In the latter case indeed selection of the more severe conditions and longer reaction times will result in drastic diminution in vanillin yield. Our invention discloses that satisfactory yields of vanillin can be obtained in the general range of conditions as herein set forth and that a selection of preferred conditions in this range may readily be ascertained by anyone who is normally skilled.

It will be apparent, therefore, that we have discovered a method by means of which vanillin may be obtained from lignin-containing substances at greatly reduced cost, the only auxiliary chemicals required being alkali and air.

It is well known that certain specific oxidizing agents have been used to obtain vanillin from lignin-containing substances. For example, the use of copper sulphate is well known. We have discovered that by using air or oxygen in accordance with our invention and in addition having present a quantity of such specific oxidizing agents the yield of vanillin may be further increased even when relatively small quantities of such oxidizing agents are present. For example, the use of copper sulphate as an oxidizing agent at a quantity corresponding to 200 grams copper sulphate hydrate per litre of alcohol plant effluent (as hereinafter defined) is illustrative of the quantity of copper sulphate which may be employed when the said copper sulphate is the principal oxidizing agent present. By adding as little as 16 grams per litre of copper sulphate hydrate to the reaction mixture and employing our invention, a reasonable further improvement of vanillin yield may be obtained over and above that when this small quantity of copper sulphate hydrate was not employed.

Our invention thus permits the use of greatly reduced quantities of such other oxidizing agents and hence effects substantial economies in their use.

We have also discovered that a catalyst may be used to increase the yield of vanillin when our invention is employed.

To prepare a catalyst such as we prefer to employ, copper sulphate may be added to waste sulphite liquor or to the liquor remaining after waste sulphite liquor has been passed through a plant to produce ethyl alcohol, which latter is herein referred to as "alcohol plant effluent," and subjected to an alkaline oxidation with finely divided air or oxygen under pressure in accordance with our present invention. At the conclusion of such oxidation there will be present in the reaction mixture a sludge containing substantially all the copper which was added as copper sulphate. This sludge seems to be composed of a mixture of various copper oxides and possibly metallic copper but its exact composition is not known to us. The said sludge may be removed from the reaction mixture by filtration or centrifuging or any other suitable mechanical means. This sludge without any further chemical treatment is a catalyst which, when added to subsequent reaction mixtures in which air or oxygen is used as a primary oxidizing agent in accordance with our invention, will serve to increase the yield of vanillin therein to a higher value than if such catalyst were not present. The sludge recovered from a subsequent reaction may be reused in a succeeding reaction and so on from reaction to reaction. Its efficiency in such a series of reactions appears to be maintained. We have reused such a catalyst at least five times without diminution of its effect over and above that of a reasonable experimental error in determining the vanillin formed in each case. Such continued reuse is of course contingent on minimizing mechanical loss of catalyst in the cycle.

Figure 1 shows in diagrammatic form an apparatus which we have used in some of our experiments and comprises a bomb 1, into which the reactants are introduced, a cover 2, containing an opening 3, leading to a condensing system 4, in which vapours from the bomb may be condensed and returned thereto by reflux through the opening 3, the condenser system terminating in the control relief valve 5, which limits the maximum pressure in the reaction system to a predetermined value. In the bottom of the bomb 1, is a porous plate 6, beneath which air or oxygen may be introduced and which serves as a gas diffusing means by which air or oxygen enters the reaction zone in a finely divided state. The air or oxygen is supplied from a pressure cylinder 7, through valves 8, 9, which control the pressure and rate of discharge from the cylinder into the gas diffusing means by tube 10.

The bomb is also equipped with a pressure gauge 11, and a thermometer well 12, containing a thermometer 13, by means of which the pressure and temperature of the reaction may be noted. The bomb 1, may be heated by any convenient means, for example, a gas flame 14. A relief valve 15, is provided for general pressure reduction.

In all experiments cited in this specification the lignin content of lignin-containing substances was estimated in terms of the methoxyl content thereof. The chemical group $CH_3O$, or methoxyl group, is well known to be a characteristic component part of lignin and is chemically determinable with reasonable accuracy by well-known analytical procedures. It is valid to assume that the lignin of a complex mixture containing lignin is proportional to the methoxyl content thereof.

In our experiments it is assumed that the ratio of methoxyl content to lignin content of any of the mixtures investigated is 15.5 to 100. Such an assumed ratio is in accordance with current good chemical usage in dealing with lignin-containing substances. Whether this assumed ratio is or is not numerically correct is immaterial because the ratio of methoxyl to lignin may be reasonably assumed to be constant for any given lignin-containing substance. The assumption of the above ratio will, therefore, serve for purposes of obtaining a valid relative guide to the quantity of lignin in lignin-containing substances.

The following description of experiments which have been performed by us will serve to illustrate the application of our invention. It is to be understood that our invention is not limited to the materials and conditions described in these experiments which are to be considered as examples only. In the majority of the experiments the lignin-containing substance used was alcohol plant effluent.

*Example 1.—Illustrates the use of air as oxidizing agent*

One litre of alcohol plant effluent was heated with 100 grams of caustic soda in the previously described apparatus. Throughout the heating cycle a steady flow of compressed air, sufficient to insure good agitation, was diffused through the liquid, the valve 5 being adusted to relieve gas at 110 lb. per square inch pressure. No catalyst or special oxidizing agent such as copper sulphate was present. The apparatus was heated sufficiently so that the reactants were subjected to an observed temperature of 169°–170° C. The apparatus was maintained under these conditions for three hours. At the conclusion of this treatment the air flow was turned off, the system was cooled to a lower temperature than its boiling point at atmospheric pressure, and the pressure reduced to that of the atmosphere by the relief valve 15 The residual liquor was then analysed for its vanillin content and the latter correlated with the original lignin content thereof. A yield of vanillin of 11.5% based on the said lignin content was obtained.

*Example 2.—Illustrating the use of small quantity of copper sulphate hydrate in conjunction with air and also illustrating preparation of catalyst*

One litre of alcohol plant effluent was heated with 100 grams of caustic soda and 16 grams copper sulphate hydrate in the previously described apparatus. As in Example 1, air was dispersed through the reaction zone, with the valve 5 adjusted to relieve gas at 110 lb. per square inch pressure, the reaction time at an observed temperature of 169°–170° C. being three hours. The experiment was concluded with temperature and pressure adjustments as in Example 1 and the reaction mixture removed from the bomb, care being taken to thoroughly wash out a sludge formed therein. This sludge as hereinbefore stated, is a catalyst in accordance with our invention and was removed from the reaction mixture by centrifuging.

In this experiment a yield of vanillin was obtained equivalent to 14.4% of the original lignin content of the alcohol plant effluent.

*Example 3.—Illustrating the use of catalyst in conjunction with air*

One litre of alcohol plant effluent was heated with 100 grams of caustic soda and the catalyst recovered from Example 2. The experiment was conducted in a similar manner to Example 1, the pressure being adjusted to 110 lb. per square inch and the time at 169°–170° C. being three hours. At the conclusion of the experiment the catalyst was recovered from the reaction mixture as in Example 2. In this experiment a yield of vanillin was obtained equivalent to 12.7% of the original lignin content of the alcohol plant effluent.

The cataylst recovered from the above was reused in a series of experiments in which the conditions of Example 3 were repeated. In this series vanillin yields of 14.8, 15.6, 14.2, and 13.8% vanillin (all based on the lignin content) were obtained on the second, third, fourth, and fifth successive reuse of the catalyst, no additional copper sulphate being added in any experiment of this series.

*Example 4.—Illustrating the use of oxygen as an oxidizing agent*

One litre of alcohol plant effluent was heated with 100 grams of caustic soda and 16 grams of copper sulphate hydrate in the previously described apparatus. Oxygen was dispersed through the reaction zone with the valve 5 adjusted to relieve gas at 70 lbs. per square inch pressure. The observed temperature was 151° C. The reaction time under the above conditions was 1½ hours. A yield of vanillin of 12.2% of the lignin content of the above plant effluent was obtained.

*Example 5.—Illustrating the use of waste sulphite liquor*

One litre of waste sulphite liquor was treated as in Example 2.

A yield of vanillin was obtained equivalent to 10.8% of the lignin content thereof.

*Example 6.—Illustrating the combined effect of pressure-temperature and reaction time on vanillin yield*

A series of experiments were carried out with a single sample of alcohol plant effluent, with alkali and copper sulphate hydrate as in Example 2 and with constant air flow. The pressure was adjusted to give a series of increasing pressures, the corresponding temperatures being noted in each case. The reaction mixture was maintained for three hours under the stated conditions. Vanillin yields were obtained as follows:

| Relief Pressure | Temperature Observed | Vanillin Yield |
|---|---|---|
| Lbs./sq. in. | ° C. | Per cent |
| 50 | 142 | 11.2 |
| 80 | 158 | 13.7 |
| 110–115 | 169 | 14.9 |
| 130–140 | 175 | 13.5 |
| 170 | 183 | 12.1 |
| 200 | 189 | 12.0 |

In another similar series of a different alcohol plant effluent the maximum yield for a two-hour reaction time was with the pressure of 170 lb. per sq. in. and at an observed temperature of 182° C. at which a 13.5% yield of vanillin was obtained.

*Example 7.—Illustrating the effect of rate of air flow*

Employing conditions similar to Example 2 with a 3 hour reaction time and pressure at 110–115 lb./sq. in. and using 100 grams caustic soda, three experiments were performed in which the rates of air flow were respectively 3.3, 6.9, and 13.4 cu. ft. per hour. The vanillin yields obtained were 9.6%, 14.5%, and 14.5% respectively.

*Example 8.—Illustrating the effect of alkali concentration*

Employing conditions similar to Example 2 with a 3 hour reaction time and pressure at 110–115 lb. sq. in. and with constant air flow, the vanillin yield changed as follows with alkali concentration:

| Alkali concentration caustic soda | Vanillin yield |
|---|---|
| G. per litre | Per cent |
| 25 | 0.8 |
| 50 | 5.9 |
| 75 | 10.7 |
| 100 | 14.5 |
| 150 | 12.2 |

In the examples cited above it must be noted that the conditions of agitation are dependent on the details of the reaction vessel. It must not be expected therefore that using different reaction vessels and different lignin-containing substances that the above results will hold for all cases. For example, it would be incorrect to assume that a pressure range 110–115 lb. would necessarily always give a maximum vanillin yield for a 3 hour reaction period. The examples are illustrative of the yields we have obtained by employing our invention and provide a guide as to the effect of variables which will enable others to apply our invention to maximum advantage in their own case.

When in this specification the word "pressure" is used it is to be understood that we refer to gauge pressure and not absolute pressure.

The words "lignin-containing substances" when used herein, have reference to the species of chemical individuals which are present in ligno-cellulose materials and to which the word lignin is applied including derivatives of the same which result from chemical processes for producing wood pulp and are present in the residual liquors from said processes.

The chemical identity and nature of lignin as originally present in ligno-cellulose materials and in the species lignin-containing substances, has not been established. The scope of the term lignin as herein used, may be defined as by Brauns in "Cellulose and its Derivatives," edited by Ott, Interscience Publishers Inc., first edition 1943, page 449, line 7 ff.

When in the claims we use the expression "auxiliary oxidizing agent" we are to be understood as meaning and including members of that class of materials comprising inorganic oxides and salts which are easily reduced under alkaline conditions and are therefore known to assist in the transfer of oxygen under such conditions, for example, copper oxide, copper sulphate, cobalt oxide, cobalt nitrate, cerium oxide, lead oxide, manganese dioxide, ferric chloride.

What we claim as our invention is:

1. A method of producing vanillin which comprises introducing waste sulfite liquor into a reaction zone, introducing caustic soda into said reaction zone in an amount equivalent to not less than 75 grams per liter of said liquor, heating the reaction mixture to a temperature in the range of above 170° to not more than 200° C., maintaining said zone under super atmospheric pressure, continuously passing an oxygen-containing gas in finely dispersed form through said liquor, continuously removing unreacted gas, the rate of addition and removal of said gas being such as to maintain a partial pressure of oxygen in said zone of less than 20 pounds per square inch, said partial pressure being lower with higher temperatures and in no case being above 10 pounds per square inch at temperatures of 175° C.–200° C., the time of said reaction being less than about four hours.

2. A method of producing vanillin which comprises introducing waste sulfite liquor into a reaction zone, introducing caustic soda into said reaction zone in an amount equivalent to not less than 75 grams per liter of said liquor, heating the reaction mixture to a temperature of about 170° to about 200° C., maintaining said zone under a super atmospheric pressure above about 110 pounds per square inch, continuously passing an oxygen-containing gas in finely dispersed form through said liquor, continuously removing unreacted gas, the rate of addition and removal of said gas being such as to maintain a partial pressure of oxygen in said zone of less than 10 pounds per square inch, lower partial pressures of oxygen being used with increased reaction temperatures, the time of said reaction being less than about four hours.

3. The process of claim 1 wherein said reaction is carried out in the presence of an oxidation catalyst.

4. The process of claim 1 wherein said sulfite liquor has been previously treated to reduce the fermentable sugar content thereof.

5. The process of claim 1 wherein is added an oxidation catalyst comprising a compound of a metal, said oxidation catalyst being selected from a group consisting of copper oxide, copper sulphate, cobalt oxide, cobalt nitrate, cerium oxide, lead oxide, manganese dioxide and ferric chloride.

HARRY BORDEN MARSHALL.
CHARLES ALFRED SANKEY.

REFERENCES CITED

The following references are of record in the file of this patent:

UNITED STATES PATENTS

| Number | Name | Date |
|---|---|---|
| 839,300 | Spurge | Aug. 21, 1906 |
| 2,434,626 | Salvesen et al. | Jan. 13, 1948 |

OTHER REFERENCES

Pearl, "Vanillin from Lignin Materials," Jour. Am. Chem. Soc., vol. 64, pages 1429–31 (1942).

Chem. Abstracts, vol. 22, 1967 citing Kurschner, J. prakt. Chem., 118, 238–62 (1928).

Chem. Abstracts, vol. 26, 3105 citing Z. Angew. Chemie, 44, 845–7, (1931).

Ser. No. 318,386, Freudenberg et al. (A. P. C.), published April 20, 1943.